(12) United States Patent
Pondelick et al.

(10) Patent No.: US 6,453,481 B1
(45) Date of Patent: Sep. 24, 2002

(54) VACUUM WASTE SYSTEM HAVING A VACUUM CONTROL VALVE

(75) Inventors: Mark A. Pondelick, Roscoe; Frederick Larry Obee, Rockford, both of IL (US)

(73) Assignee: EVAC International Oy, Helsinki (FI)

(*) Notice: Subject to any disclaimer, the term of this patent is extended or adjusted under 35 U.S.C. 154(b) by 0 days.

(21) Appl. No.: 09/813,196

(22) Filed: Mar. 20, 2001

(51) Int. Cl.[7] .............................................. E03D 11/10
(52) U.S. Cl. ........................... 4/431; 4/321; 137/565.23
(58) Field of Search ............................. 4/431–434, 321; 137/565.23

(56) References Cited

U.S. PATENT DOCUMENTS

| | | | |
|---|---|---|---|
| 3,239,849 A | 3/1966 | Liljendahl | 4/77 |
| 3,922,730 A | 12/1975 | Kemper | 4/10 |
| 3,995,328 A | 12/1976 | Carolan et al. | 4/10 |
| 4,063,315 A | 12/1977 | Carolan et al. | 4/10 |
| 4,184,506 A | 1/1980 | Varis et al. | 137/205 |
| 4,246,925 A | 1/1981 | Oldfelt | 137/205 |
| 4,275,470 A | 6/1981 | Badger et al. | 4/316 |
| 4,297,751 A * | 11/1981 | Olin et al. | 4/431 |
| 4,357,719 A | 11/1982 | Badger et al. | 4/316 |
| 4,521,925 A | 6/1985 | Chen et al. | 4/362 |
| 4,713,847 A | 12/1987 | Oldfelt et al. | 4/316 |
| 4,819,279 A * | 4/1989 | Sigler et al. | 4/321 |
| 5,007,117 A | 4/1991 | Oldfelt et al. | 4/432 |
| 5,133,853 A | 7/1992 | Mattsson et al. | 210/104 |
| 5,317,763 A * | 6/1994 | Frank et al. | 4/434 |
| 5,604,938 A | 2/1997 | Tyler | 4/321 |
| 5,732,417 A | 3/1998 | Pondelick | 4/427 |
| 5,956,780 A * | 9/1999 | Tyler | 4/431 |
| 6,006,373 A * | 12/1999 | Hoang | 4/431 |
| 6,131,596 A | 10/2000 | Monson | 137/14 |
| 6,152,160 A | 11/2000 | Wilcox et al. | 137/15.01 |
| 6,216,285 B1 | 4/2001 | Olin | 4/431 |
| 6,374,431 B1 * | 4/2002 | Dahlberg | 4/434 |

* cited by examiner

*Primary Examiner*—Charles R. Eloshway
(74) *Attorney, Agent, or Firm*—Marshall, Gerstein & Borun.

(57) ABSTRACT

A vacuum waste system is disclosed having a receptacle for receiving waste, the receptacle having an outlet, and a collection tank in fluid communication with the receptacle outlet. A vacuum source is in fluid communication with the collection tank to produce a partial vacuum in the collection tank. A flush actuator is provided that is operable to generate a flush command, and a flush valve is disposed between the toilet outlet and the collection tank having a normally closed position, the flush valve actuating to an open position for a flush interval in response to the flush command, thereby to control fluid communication between the collection tank and toilet outlet. A vacuum control valve is disposed between the vacuum source and the collection tank, the vacuum control valve being operable between open and closed positions thereby to control fluid communication between the collection tank and vacuum source. The vacuum control valve is operably linked to the flush valve so that the vacuum control valve is operated in the closed position during at least a portion of the flush interval, thereby to control air flow through the system during operation.

20 Claims, 4 Drawing Sheets

VACUUM WASTE SYSTEM HAVING A VACUUM CONTROL VALVE

FIELD OF THE INVENTION

The present invention relates to vacuum waste systems and methods for operating such systems.

BACKGROUND OF THE INVENTION

Vacuum waste systems are generally known in the art in which one or more waste receptacles, such as a toilets or galley waste sinks, fluidly communicate with a collection tank. The tank is connected to a vacuum generator, such as a vacuum blower or pump, which is operable to create a partial vacuum in the tank. A flush valve, which opens in response to a flush command, is disposed between each receptacle and the waste tank to control fluid communication between the receptacle and the waste tank.

When installed on an aircraft, such vacuum waste systems typically have a bypass line, which allows the system to operate in low altitude and high altitude modes. The bypass line establishes fluid communication between the collection tank and the atmosphere outside the aircraft, without passing through the vacuum generator. A check valve is typically provided in the bypass line to allow direct communication only when the atmospheric pressure is sufficiently lower than the ambient air pressure inside the aircraft cabin. As a result, the vacuum waste system may be operated in the low altitude mode when the aircraft is on the ground or flying at lower altitudes, typically below 16,000 feet. In this mode, the vacuum generator is used to create the partial vacuum level in the waste tank. When the flush command is generated, the flush valve opens, and the pressure differential between the ambient cabin air pressure at the receptacle and the partial vacuum pressure in the collection tank transports waste in the receptacle to the waste tank.

The high altitude mode of operation is used when the aircraft is operating at higher altitudes, such as above 16,000 feet. It will be appreciated that the atmospheric pressure at high altitudes is reduced, and therefore the cabin of the aircraft must be pressurized. As a result, a pressure differential between the pressurized cabin air and the high altitude atmospheric pressure exists that may be used to transfer waste from the receptacle to the tank. Accordingly, the vacuum generator is switched off and the check valve in the bypass line is opened to create partial vacuum in the tank. The flush valve may then operate as described above to transport the waste.

The vacuum generators typically used in vacuum waste systems are designed to handle air only, and therefore are extremely intolerant of contamination. As a result, care must be taken to isolate the vacuum generator from waste and rinse fluid transported by the vacuum waste system. Separation of contaminants from the air is particularly difficult due to the large amount of air that is pulled in by the system during operation. The incoming air may create a rapid air stream that may easily become entrained with liquid contaminants from the receptacle or tank. To prevent liquid contaminants from reaching the vacuum generator or being ejected out of the aircraft through the bypass line, an air/liquid separator is typically provided at the collection tank. In addition, the collection tank is often oversized to provide spacing between the vacuum port on the tank and the fluid level in the tank. The water separator and oversized tank take up additional space and add weight to the system, considerations which are particularly important in aircraft applications.

In addition, the amount of air drawn into conventional vacuum waste systems can be excessive, thereby generating unwanted noise. When the flush valve is opened in a typical vacuum waste system, an uninterrupted air flow path is created from the receptacle to the vacuum source. As a result, the entire volume of the system that is placed under partial vacuum is relatively large, and therefore excessive air is rapidly drawn into the system. Furthermore, the vacuum source maybe operating when the flush valve is open, such as during high altitude mode, and therefore still more air is drawn into the vacuum waste system. The large vacuum volume and continued vacuum source connection may cause the air to enter through the receptacle at a high velocity, thereby generating noise.

Accordingly, it is evident that a vacuum waste system is needed which isolates the vacuum source from liquid contaminants while reducing the size and weight of the system, and further reduces noise generated during operation of the system.

SUMMARY OF THE INVENTION

In accordance with certain aspects of the present invention, a vacuum waste system is provided having a receptacle for receiving waste, the receptacle having an outlet. A collection tank is in fluid communication with the receptacle outlet, and a vacuum source fluidly communicates with the collection tank to produce a partial vacuum in the collection tank. A flush actuator is operable to generate a flush command, and a flush valve is disposed between the toilet outlet and the collection tank having a normally closed position, the flush valve actuating to an open position for a flush interval in response to the flush command, thereby to control fluid communication between the collection tank and toilet outlet. A vacuum control valve is disposed between the vacuum source and the collection tank, the vacuum control valve being operable between open and closed positions thereby to control fluid communication between the collection tank and vacuum source, the vacuum control valve being operably linked to the flush valve so that the vacuum control valve is operated in the closed position during at least a portion of the flush interval.

In accordance with additional aspects of the present invention, a vacuum waste system is provided for use on an aircraft, the vacuum waste system comprising a receptacle for receiving waste, the receptacle having an outlet, and a waste pipe having a first end connected to the receptacle outlet and a second end. A collection tank has a waste inlet port connected to the waste pipe second end and a vacuum port, and a flush actuator is provided which is operable to generate a flush command. A flush valve is disposed in the waste pipe having a normally closed position, the flush valve actuating to an open position for a flush interval in response to the flush command, thereby to control fluid communication between the collection tank and toilet outlet. A common pipe has a first end attached to the vacuum port and a second end, and a vacuum pipe has a first end and a second end, the vacuum pipe first end being in fluid communication with the common pipe second end. A bypass pipe has a first end in fluid communication with the common pipe second end, and a second end, and a discharge pipe has a first end in fluid communication with the vacuum pipe second end and bypass pipe second end, and a second end in fluid communication with atmosphere outside the aircraft, the atmosphere having a reduced pressure at higher altitudes to provide a vacuum source. A vacuum generator is disposed in the vacuum pipe for generating a partial vacuum in the collection tank when the aircraft is at lower altitudes. A vacuum control valve is disposed in the common pipe, the vacuum control valve being operable between open and closed positions thereby to control fluid flow through the common pipe, the vacuum control valve being operably linked to the flush valve so that the vacuum control valve is operated in the closed position during at least a part of the flush interval.

In accordance with further aspects of the present invention, a method of operating a vacuum waste system is provided to control air flow through the system during a flush cycle. The vacuum waste system includes a receptacle having an outlet, a collection tank in fluid communication with the receptacle outlet, a vacuum source in fluid communication with the collection tank to produce a partial vacuum in the collection tank, a flush actuator associated with the flush valve, the flush actuator operable to generate the flush command, a flush valve disposed between the toilet outlet and the collection tank operable between open and closed positions, and a vacuum control valve disposed between the vacuum source and the collection tank operable between open and closed positions. The method comprises normally operating the flush valve in the closed position, actuating the flush valve to the open position for a flush interval in response to the flush command, and operating the vacuum control valve in the closed position during at least a part of the flush interval, thereby to limit air flow out of the collection tank.

Other features and advantages are inherent in the apparatus claimed and disclosed or will become apparent to those skilled in the art from the following detailed description and its accompanying drawings.

DETAILED DESCRIPTION OF THE PREFERRED EMBODIMENT

Figure 1:
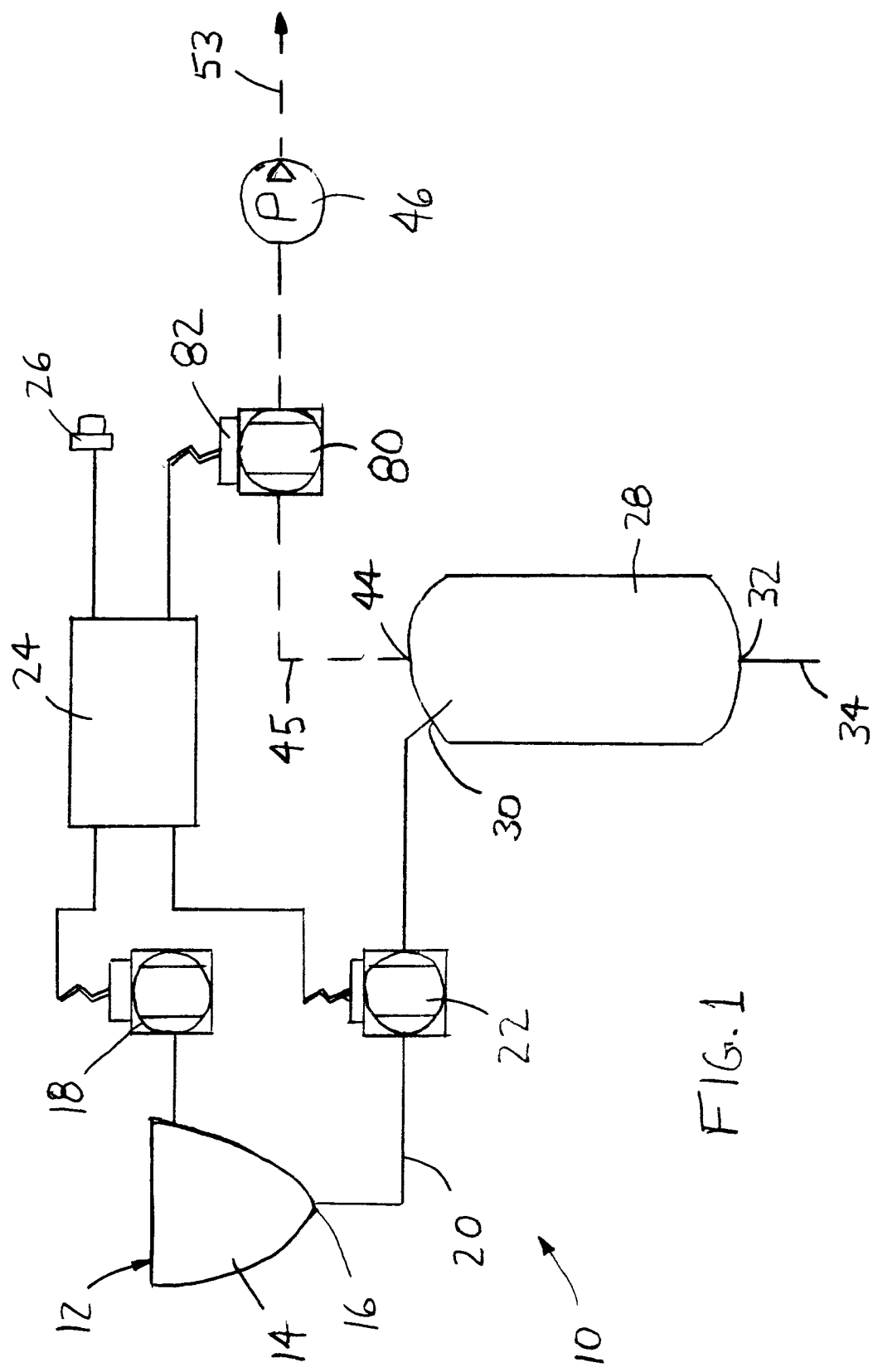
FIG. 1 is a schematic illustration of a vacuum waste system in accordance with the teachings of the present invention.

A vacuum waste system in accordance with the teachings of the present invention is generally indicated in FIG. 1 with reference numeral 10. The vacuum waste system 10 may be used in either a stationary application, or on a vehicle such as a train, boat, or aircraft. The vacuum waste system 10 includes a waste receptacle, such as a galley waste sink or, as illustrated, a toilet 12 having a bowl 14 and an outlet 16. While a single toilet 12 is shown in FIG. 1, it will be appreciated that multiple toilets may be provided with the system 10 without departing from the teachings of the present invention. The toilet may be connected to a source of rinse water (not shown) through a rinse valve 18. A waste pipe 20 is connected to the outlet 16 of the toilet 12 and has a flush valve 22 disposed therein. Both the rinse valve 18 and flush valve 22 are normally closed, but may be actuated to an open position. A flush button 26 is provided that is capable of generating a flush command. A controller 24 is operably connected to the flush valve 22, rinse valve 18, and flush button 26.

A collection tank 28 is provided for collecting waste transported from the toilet 12. The collection tank 28 has a waste inlet port 30 connected to the waste pipe 20 thereby to establish fluid communication between the toilet 12 and the collection tank 28. The illustrated collection tank 28 has a drain port 32 attached to a drain pipe 34 for emptying the tank 28.

A vacuum port 44 is provided for connecting the collection tank 28 to a vacuum generator, such as a vacuum pump 46, thereby to create a partial vacuum in the tank 28. As shown in FIG. 1, a vacuum pipe 45 extends from the vacuum port 44 to the vacuum pump 46. An exhaust pipe 53 is attached to an outlet of the pump 46 for discharging air evacuated from the tank 28.

In accordance with certain aspects of the present invention, a vacuum control valve 80 is disposed in the vacuum pipe 45 between the vacuum pump 46 and the tank 28 for controlling the volume of air pulled into the system 10 during a flush operation. The vacuum control valve 80 is moveable between open and closed positions, and is operably connected to the controller 24, as shown in FIG. 1.

In operation, the rinse valve 18 and flush valve 22 are normally closed, and the vacuum pump 46 is operated to create a partial vacuum in the tank 28. Once the desired partial vacuum level is reached, the vacuum pump 46 is switched off. The vacuum pump 46 may be controlled by partial vacuum level feedback from the tank 28 using control systems well-known in the art, such as pressure switches. Once the tank 28 is at the desired partial vacuum level and the flush button 26 is actuated, a flush command signal is generated that is received by the controller 24. In response to the flush command signal, the controller 24 momentarily opens the rinse valve 18 for a rinse interval, which may be a fixed period of time such one second, to introduce rinse fluid into the toilet 12. While the rinse valve is open or after it has returned to the closed position, the controller 24 momentarily opens the flush valve 22. The flush valve 22 is opened virtually simultaneously with the rinse valve 18 for a flush interval, which may also be a fixed period of time, such as four seconds. While the flush valve 22 is open, a pressure differential is created across the toilet due to the ambient pressure present outside the toilet and the partial vacuum present in the tank 28. The pressure differential acts to transport any waste and rinse fluid from the toilet 12 to the tank 28. A volume of air at ambient pressure is also pulled into the tank 28, thereby dropping the vacuum level in the tank. The ambient air is evacuated from the tank 28 when the vacuum pump 46 subsequently operates.

While the embodiment described above is a trapped vacuum system, in which the vacuum pump 46 is operated to maintain the tank 28 under constant partial vacuum pressure, it will be appreciated that other systems may be used in accordance with the present invention. For example, a vacuum blower may be used which produces partial vacuum pressure in the tank 28 on demand. As a result, the flush cycle operation described above is slightly altered, so that the vacuum blower is operated in response to the flush command, and the flush valve 22 opens once the desired partial vacuum level is obtained. The vacuum blower may remain on until the flush valve 22 closes, at which time it will be shut off. In this system, therefore, the tank 28 is at approximately atmospheric pressure between flushes, rather than being maintained at the partial vacuum level as in the trapped vacuum system.

In accordance with the teachings of the present invention, the vacuum control valve 80 is operated to control air flow during the flush interval. In the embodiment illustrated in FIG. 1, the vacuum control valve 80 has a controller 82 which is responsive to signals from the main controller 24. As a result, the main controller 24 may be programmed to send a close valve signal to the controller 82 to operate the vacuum control valve 80 in the closed position during at least part of the flush interval. As a result, the period of direct communication between the toilet 12 and the vacuum pump 46 is controlled by the vacuum control valve 80, thereby reducing the amount of cabin air pulled into the tank 28.

In the preferred embodiment, the vacuum control valve 80 is operated in the closed position during the entire flush interval. When operated in this manner, little or no air is allowed to flow through the vacuum pipe 45 while the flush valve 22 is open. As a result, the inflow of ambient air is divided into two stages. First, with the flush valve 22 open and the vacuum control valve 80 closed, the ambient air travels to the tank 28 as it transports waste and rinse fluid. In this first stage, therefore, the closed vacuum control valve 80 prevents ambient air from traveling through the vacuum pipe 45. In the second stage, the flush valve 22 is closed and the vacuum control valve 80 is open, thereby allowing the vacuum pump 46 to evacuate the ambient air from the tank 28. As a result, the waste and rinse fluid are allowed to settle in the tank 28 due to gravity before the ambient air is evacuated through the vacuum pipe 45, thereby minimizing the potential for contaminants to reach the vacuum pump 46.

The vacuum control valve 80 may be controlled in various operation sequences to achieve the desired air flow reduction. The vacuum control valve 80 may be operated in the closed position in response to the flush command, either immediately or after a delay period. In addition, the controller 82 may include a timer module 82 which allows the vacuum control valve 80 to re-open after a set valve close period, such as four seconds. In the alternative, the vacuum control valve 80 may be signaled according to feedback from the flush valve 22. For example, the vacuum control valve 80 may be operated according to flush valve voltage, so that the vacuum control valve 80 is operated in the closed position whenever the flush valve 22 is driven open. The word "operated" is used herein to mean that the valve is either actuated or maintained in the position so indicated. Accordingly, operating the vacuum control valve 80 in the closed position includes: 1) actuating the vacuum control valve 80 from the open position to the closed position, if the valve is in the open position; and 2) maintaining the vacuum control valve 80 in the closed position, if the valve is already in the closed position. Once the desired valve close period has elapsed, the vacuum control valve will be free to return to its previous state.

By controlling air flow during operation, the vacuum control valve 80 reduces the risk of contaminants reaching the vacuum pump 46. The volume of the system that is placed under partial vacuum is reduced when the valve is closed, thereby reducing the amount of air pulled into the system 10 when the flush valve 22 is open. In addition, since the vacuum control valve 80 is closed, no air flows through the vacuum pipe 45, thereby minimizing the amount of contaminants entrained in the incoming airflow that may reach the vacuum pump 46. As a result, the air/water separator used in conventional systems may be reduced or eliminated. In addition, the size of the collection tank 28 may be reduced, since the two-stage operation separates the waste transport and tank evacuation steps, and therefore liquid that is splashed as additional waste material enters the tank 28 is less likely to be pulled into the vacuum pipe. Still further, by reducing the volume of incoming air and the velocity at which the incoming air travels, noise generated during a flush cycle is also significantly reduced.

Figure 2:
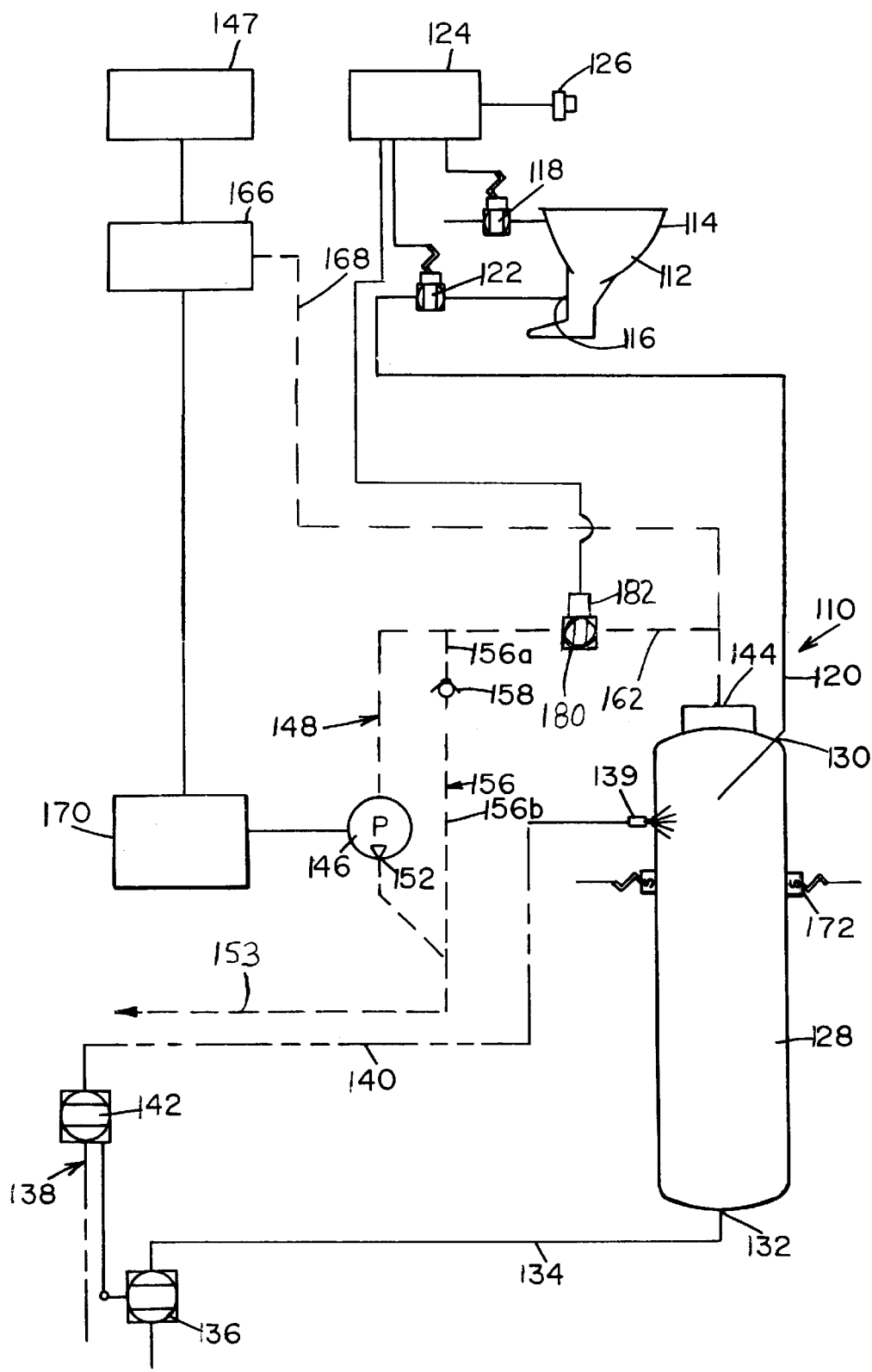
FIG. 2 is a schematic illustration of another vacuum waste system for use on an aircraft, in accordance with the teachings of the present invention.

An alternative embodiment of a vacuum control system that is particularly suited for use on an aircraft is schematically shown in FIG. 2, generally indicated by the reference numeral 110. The vacuum waste system 110 incorporates several of the same components and is operated in substantially the same way as the embodiment of FIG. 1, and therefore only the differences are described in detail. Furthermore, like reference numerals are used in FIG. 2 to indicate components that are the same or similar to those described in the above embodiment.

The collection tank 128 has a waste inlet port 130 connected to the waste pipe 120 thereby to establish fluid communication between the toilet 112 and the collection tank 128. The illustrated collection tank 128 also has a drain port 132 attached to a drain pipe 134 having a drain valve 136 disposed therein. The drain valve 136 may be selectively opened to drain the tank during routine servicing when the aircraft is on the ground. Operation of the drain valve 136 may be interconnected with a tank rinse system 138 comprising a sprayer 139 connected to a tank rinse fluid source (not shown) by a tank rinse pipe 140 having a tank rinse valve 142 disposed therein. The tank rinse valve 142 is preferably controlled to open when the drain valve 136 is opened. When the tank rinse valve 142 is opened, tank rinse fluid travels through the tank rinse pipe 140 to the sprayer 139, thereby to rinse the inside surface of the collection tank 128 as the collection tank 128 is emptied.

The collection tank 128 also has a vacuum port 144 that is connected to alternative low pressure sources, which may be used to create a partial vacuum in the collection tank 128. The phrase "partial vacuum" is defined herein to indicate the condition where an air pressure is lower relative to the ambient air pressure present at the exterior of the toilet 112. In the embodiment illustrated at FIG. 2, therefore, the alternative low pressure sources are a vacuum generator, such as vacuum pump 146, and the atmospheric pressure present at high altitudes, when compared to the pressurized aircraft cabin. While the current embodiment uses a vacuum pump 146, it will be appreciated that other vacuum sources, such as an air ejector or vacuum blower, may be used without departing from the scope of the present invention. The vacuum pump 146 is electrically connected to a supply of power, such as an aircraft power source 147 via a vacuum pump relay 170.

To utilize the alternative low pressure sources, a common pipe 162 is attached to the vacuum port 144, and includes two branches: a vacuum pipe 148 and a bypass pipe 156. The vacuum pump 146 is disposed in the vacuum pipe 148, while a check valve 158 is disposed in the bypass pipe 156. The downstream ends of the vacuum pipe 148 and bypass pipe 156 are connected to an exhaust pipe 153, which is open to atmosphere outside the aircraft.

A vacuum control valve 180 is disposed in the common pipe 162 to control communication between the tank 128 and the low pressure sources. The vacuum control valve 180 is moveable between open and closed positions, and is controlled, in part, according to the altitude of the aircraft. For example, if the aircraft is at a low altitude such that the vacuum pump 126 is used to create partial vacuum in the tank 128, the vacuum control valve 180 is operated in a normally closed position, to retain the partial vacuum in the tank 128. When the partial vacuum level in the tank 128 drops below a desired level such that the vacuum pump 146 is switched on, the vacuum control valve 180 is actuated to an open position so that air is evacuated from the tank 128. When the desired partial vacuum level is reestablished in the tank 128, the vacuum pump 146 is switched off and the vacuum control valve 180 is closed, thereby to trap vacuum in the tank 128. Alternatively, when the aircraft is at high altitudes such that the high altitude atmospheric pressure is used to create the partial vacuum in the tank 128, the vacuum control valve 180 is operated in a normally open position, to establish communication with atmosphere outside the aircraft.

A vacuum switch 166 maybe provided to control operation of the vacuum pump 146 when the aircraft is at low altitudes. The vacuum switch 166 is pneumatically connected by a vacuum switch pipe 168 to the common pipe 162 at a point upstream of the vacuum control valve 180. The vacuum switch 166 is operably connected, such as by lead wires, to the vacuum pump 146 through a vacuum pump relay 170. The vacuum switch 166 is responsive to pressure in the vacuum switch pipe 168 to actuate between open and closed positions. When a predetermined vacuum pressure is present in the vacuum switch pipe 168, the vacuum switch 166 moves to the open position to stop operation of the vacuum pump 146. When the pressure in the vacuum switch pipe 168 exceeds the predetermined vacuum level, the switch 166 automatically actuates to the closed position to turn the vacuum pump 146 on. The switch 166 may be set so that operation of the pump 146 ceases when the pressure level reaches a low-end limit, such as approximately nine inches Hg below gauge pressure, and resumes operation when the pressure level reaches a high-end limit, such as six inches Hg below gauge pressure, to avoid rapid cycling of vacuum pump 146. Instead of the vacuum switch 166, a vacuum sensor (not shown) may be provided that senses vacuum level and generates an output signal. The vacuum pump 146 may then be controlled according to the output signal.

While the vacuum switch 166 is described above for use with the vacuum pump 146, it will be appreciated that the switch 166 may also be similarly connected and operated to control alternative vacuum generators, such as air ejectors or vacuum blowers. It will further be appreciated that the vacuum control valve 180 maybe actuated in part by a signal from the vacuum switch 166.

During normal operation at low altitudes, the vacuum control valve 180 is normally closed to retain a partial vacuum in the tank 128. When the flush button 126 is actuated to generate a flush command, the controller 124 opens the flush valve 122 for a flush interval, which may be a set period of time such as four seconds. During at least a part of the flush interval, the vacuum control valve 180 is operated in the closed position, even if the vacuum level in the tank 128 has dropped below the low vacuum level. While the flush valve 122 is open, the higher pressure cabin air and lower pressure partial vacuum create a pressure differential across the toilet 112, which serves to force waste and rinse fluid from the toilet 112 to the collection tank 128. In addition to the waste and rinse fluid, cabin air is also pulled into the tank 128, thereby reducing the partial vacuum level. After the flush interval has elapsed, the flush valve 122 closes. If the pressure level in the tank is above the desired partial vacuum level, and the flush valve 122 is closed, the vacuum pump 146 will be switched on and the vacuum control valve 180 will be opened to evacuate air from the collection tank 128. When the desired partial vacuum level is reestablished, the vacuum pump 146 is switched off and the vacuum control valve 180 is closed to once again trap vacuum in the collection tank 128.

The vacuum waste system 110 also operates in a second mode, when the aircraft is at high altitudes (i.e., above approximately 16,000 feet). In this mode, the lower atmospheric pressure present at high altitudes is used as a low pressure source to create a pressure differential between tank pressure and cabin air pressure. The high altitude atmospheric pressure is typically less than the vacuum pressure generated by the vacuum pump 146, and therefore the bypass check valve 158 automatically opens at high altitude so that the collection tank 128 is also at the ambient, high-altitude pressure. In addition, the vacuum control valve 180 is operated in the open position in response to a high altitude signal, which may be provided from the aircraft, an altitude switch, or other altitude indicating device. In the preferred embodiment, the altitude indicating device is used to disable the vacuum pump 146 at high altitude.

When the flush button 126 is actuated to generate a flush command at high altitude, the controller 124 opens the flush valve 122 for the flush interval to transport waste and cabin air into the collection tank 128. The vacuum control valve 180 is operated in the closed position during at least part of the flush interval. Upon completion of the flush interval, the flush valve 122 closes and the vacuum control valve 180 is re-opened to once again establish the desired vacuum level in the tank 128.

A level sensor is preferably provided in the collection tank 128 for indicating when the tank is full and requires emptying. In the embodiment illustrated in FIG. 2, an ultrasonic level sensor 172 is attached to the collection tank 128 at a sufficient height above the bottom of the tank 128. The ultrasonic sensor 172 generates sound waves which are altered when the fluid level reaches the height of the sensor. The ultrasonic sensor 172 senses the altered sound waves and generates a signal indicating that the collection tank 128 is substantially full.

During high altitude operation of the vacuum waste system 110, a portion of the air discharged from the tank 128 may still flow through the pump 146. As a result, the pump 146 may be subject to any contamination that may still be entrained in the air flow.

Figure 3:
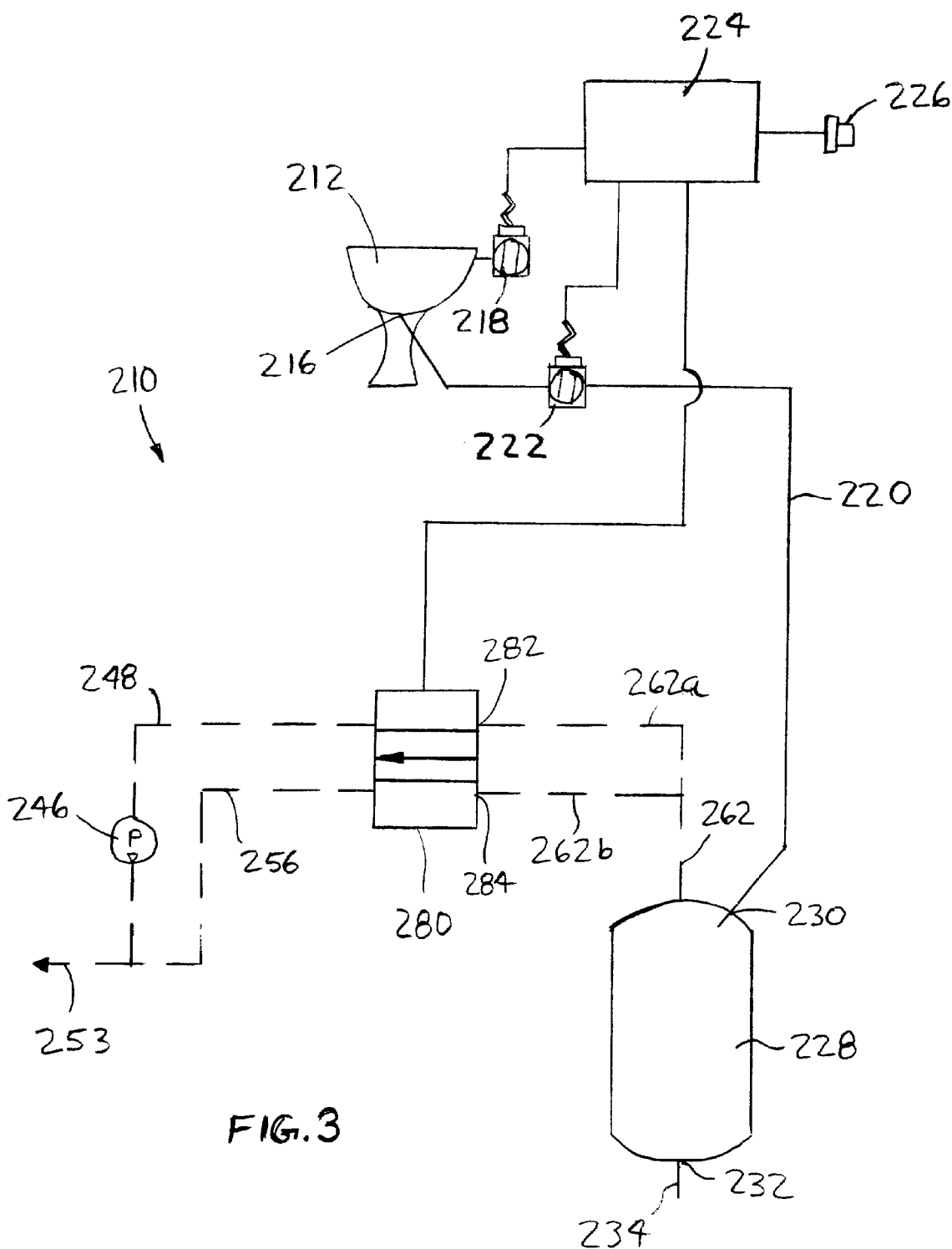
FIG. 3 is a schematic illustration of an alternative aircraft vacuum waste system, in accordance with the teachings of the present invention.

In the alternative vacuum waste system 210 illustrated in FIG. 3, the vacuum pump 246 is provided with an enhanced degree of protection from contamination. The common pipe 262 is divided into a vacuum branch 262a and a bypass branch 262b. The vacuum control valve 280 is preferably a three-position, dual port valve similar to the discharge valve taught in the commonly owned, co-pending patent application of Stradinger et al for Valve Set for a Vacuum Toilet, U.S. Ser. No. 09/713,870, filed Nov. 16, 2000. The valve 280 has a vacuum port 282 connected to the vacuum branch 262a, and a bypass port 284 connected to. the bypass branch 262b. The vacuum control valve 280 is operable in three positions: (1) a closed position, in which both the vacuum and bypass ports 282, 284 are closed; (2) a vacuum-open position, in which the vacuum port 282 is open and the bypass port 284 is closed; and (3) a bypass-open position, in which the bypass port 284 is open and the vacuum port 282 is closed.

In operation, the vacuum control valve 280 is controlled according to the mode of operation of the system 210. At low altitudes, the vacuum control valve 280 is normally operated in the closed position, to trap partial vacuum in the tank 228. The vacuum control valve 280 may be temporarily operated to the vacuum-open position if the vacuum pump 246 is switched on to reestablish partial vacuum in the tank. When a flush command is given, the vacuum control valve 280 is operated in the closed position for at least a portion of the flush interval. At high altitudes, the vacuum control valve 280 is normally operated in the bypass-open position, to place the tank at high altitude atmospheric pressure. When a flush command is given, the vacuum control valve 280 is again operated in the closed position for at least a portion of the flush interval.

The alternative vacuum waste system 210 of FIG. 3, therefore, directs all air flow through the bypass pipe 256 during high altitude operation, thereby eliminating a potential source of contamination to the vacuum pump 246. Eliminating air flow through the vacuum pipe at high altitude is significant, in that approximately 95% of all toilet flushes occur at high altitude. In addition, the vacuum control valve 280 performs the bypass check valve function, thereby obviating the need for the check valve 258 provided in the embodiment illustrated at FIG. 2.

Figure 4:
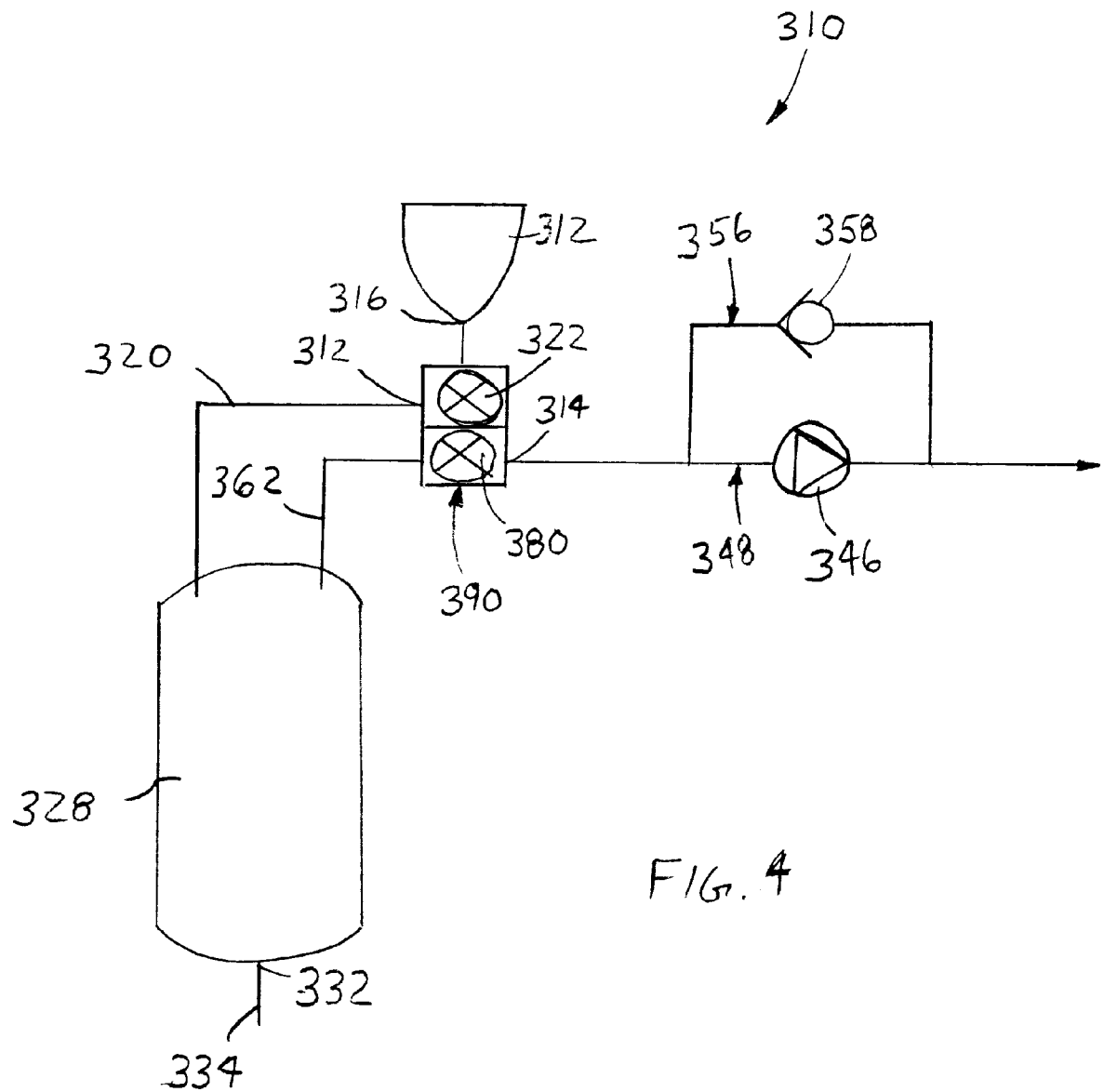
FIG. 4 is a schematic illustration of a further alternative vacuum waste system particularly suited for small volume applications, in accordance with the teachings of the present invention.

A further alternative embodiment of a vacuum waste system is illustrated in FIG. 4, which is particularly suited for small volume applications. In multiple toilet applications, the volume of the system that is normally placed under partial vacuum is relatively large due to the sizing of the tank and the piping required for the toilets. As a result, a significant partial vacuum reservoir is created which is greater than that needed during a single flush. The excessive air flow created by the large partial vacuum reservoir renders large volume systems particularly vulnerable to vacuum pump contamination, and therefore it is preferred to operate the vacuum control valve in the closed position during the entire flush interval. In small volume systems, however, the partial vacuum reservoir is much smaller, so that the volume of cabin air pulled into the system is reduced and the partial vacuum level may be dissipated quickly during a single flush. As a result, there is less need to close the vacuum control valve for the entire flush interval.

Accordingly, the vacuum waste system 310 illustrated in FIG. 4 includes a composite valve set 390 that incorporates both the flush valve 322 and vacuum control valve 380. The composite valve 390 includes a waste transport port 312 and an air evacuation port 314 positioned proximate one another. The valve members of the flush valve 322 and vacuum control valve 380 may be mechanically linked, so that operation of the flush valve 322 to the open position automatically drives the vacuum control valve 380 to the closed position, and vice versa. In this embodiment, therefore, the valves 322, 380 are actuated simultaneously. The mechanical link between the valve members obviates the need for a separate actuator for the vacuum control valve 380 and a timer module 82, as used in the previous embodiments.

The foregoing detailed description has been given for clearness of understanding only, and no unnecessary limitations should be understood therefrom, as modifications would be obvious to those skilled in the art.

What is claimed is:

1. A vacuum waste system comprising:
   a receptacle for receiving waste, the receptacle having an outlet;
   a collection tank in fluid communication with the receptacle outlet;
   a vacuum source in fluid communication with the collection tank to produce a partial vacuum in the collection tank;
   a flush actuator operable to generate a flush command;
   a flush valve disposed between the toilet outlet and the collection tank having a normally closed position, the flush valve actuating to an open position for a flush interval in response to the flush command, thereby to control fluid communication between the collection tank and toilet outlet; and
   a vacuum control valve disposed between the vacuum source and the collection tank, the vacuum control valve being operable between open and closed positions thereby to control fluid communication between the collection tank and vacuum source, the vacuum control valve being operably linked to the flush valve so that the vacuum control valve is operated in the closed position during at least a portion of the flush interval.

2. The vacuum waste system of claim 1, further comprising a controller operably connected to the flush valve, flush actuator, and vacuum control valve, in which the controller operates the vacuum control valve in the closed position.

3. The vacuum waste system of claim 1, in which the vacuum control valve is mechanically linked to the flush valve so that actuation of the flush valve to the open position automatically operates the vacuum control valve to the closed position.

4. The vacuum waste system of claim 3, in which the vacuum control valve and flush valve are integrally provided as a composite valve set.

5. The vacuum waste system of claim 1, in which the vacuum control valve is operated in the closed position during the entire flush interval.

6. The vacuum waste system of claim 1, in which the flush valve requires a flush valve voltage to actuate to the open position, and in which the vacuum control valve is operated in the closed position in response to the flush valve voltage.

7. A vacuum waste system for use on an aircraft, the vacuum waste system comprising:
   a receptacle for receiving waste, the receptacle having an outlet;
   a waste pipe having a first end connected to the receptacle outlet and a second end;
   a collection tank having a waste inlet port connected to the waste pipe second end and a vacuum port;
   a flush actuator operable to generate a flush command;
   a flush valve disposed in the waste pipe having a normally closed position, the flush valve actuating to an open position for a flush interval in response to the flush command, thereby to control fluid communication between the collection tank and toilet outlet;
   a common pipe having a first end attached to the vacuum port and a second end;
   a vacuum pipe having a first end and a second end, the vacuum pipe first end being in fluid communication with the common pipe second end;
   a bypass pipe having a first end in fluid communication with the common pipe second end, and a second end;
   a discharge pipe having a first end in fluid communication with the vacuum pipe second end and bypass pipe second end, and a second end in fluid communication with atmosphere outside the aircraft, the atmosphere having a reduced pressure at higher altitudes to provide a vacuum source;
   a vacuum generator disposed in the vacuum pipe for generating a partial vacuum in the collection tank when the aircraft is at lower altitudes;
   a vacuum control valve disposed in the common pipe, the vacuum control valve being operable between open and closed positions thereby to control fluid flow through the common pipe, the vacuum control valve being operably linked to the flush valve so that the vacuum control valve is operated in the closed position during at least a part of the flush interval.

8. The vacuum waste system of claim 7, further comprising a controller oyerably connected to the flush valve, flush actuator, and vacuum control valve, in which the controller operates the vacuum control valve in the closed position.

9. The vacuum waste system of claim 7, in which the vacuum control valve is mechanically linked to the flush valve so that actuation of the flush valve to the open position automatically operates the vacuum control valve to the closed position.

10. The vacuum waste system of claim 9, in which the vacuum control valve and flush valve are integrally provided as a composite valve set.

11. The vacuum waste system of claim 7, in which the vacuum control valve is operated in the closed position during the entire flush interval.

12. The vacuum waste system of claim 7, in which the flush valve requires a flush valve voltage to actuate to the open position, and in which the vacuum control valve is operated in the closed position in response to the flush valve voltage.

13. The vacuum waste system of claim 7, in which the common pipe comprises a vacuum branch and a bypass branch, and in which the vacuum control valve comprises a vacuum port connected to the vacuum branch and a bypass port connected to the bypass branch, the vacuum control valve being operable in a closed position, in which the vacuum port and bypass port are closed, a vacuum-open position, in which the vacuum port is open and the bypass port is closed, and a bypass-open position, in which the bypass port is open and the vacuum port is closed.

14. A method of operating a vacuum waste system to control air flow through the system during a flush cycle, the vacuum waste system including a receptacle having an outlet, a collection tank in fluid communication with the receptacle outlet, a vacuum source in fluid communication with the collection tank to produce a partial vacuum in the collection tank, a flush actuator associated with the flush valve, the flush actuator operable to generate the flush command, a flush valve disposed between the toilet outlet and the collection tank operable between open and closed positions, and a vacuum control valve disposed between the vacuum source and the collection tank operable between open and closed positions, the method comprising:

normally operating the flush valve in the closed position;

actuating the flush valve to the open position for a flush interval in response to the flush command; and operating the vacuum control valve in the closed position during at least a part of the flush interval, thereby to limit air flow out of the collection tank.

15. The method of claim 14, in which a controller is operably connected to the flush valve, flush actuator, and vacuum control valve, and in which the controller signals receives the flush command, signals actuation of the flush valve, and signals operation of the vacuum control valve.

16. The method of claim 14, in which the vacuum control valve is mechanically linked to the flush valve so that the flush valve actuation and vacuum control valve operation steps are performed simultaneously.

17. The method of claim 16, in which the vacuum control valve and flush valve are integrally provided as a composite valve set.

18. The method of claim 14, in which the vacuum control valve is operated in the closed position during the entire flush interval.

19. The method of claim 14, in which the flush valve requires a flush valve voltage to actuate to the open position, and in which the vacuum control valve is operated in the closed position in response to the flush valve voltage.

20. The method of claim 14, in which the vacuum control valve comprises a three-position valve having a vacuum port and a bypass port, the three-position valve being operable between a closed position, in which the vacuum port and bypass port are closed, a vacuum-open position, in which the vacuum port is open and the bypass port is closed, and a bypass-open position, in which the bypass port is open and the vacuum port is closed.

* * * * *

UNITED STATES PATENT AND TRADEMARK OFFICE
CERTIFICATE OF CORRECTION

PATENT NO.   : 6,453,481 B1
DATED        : September 24, 2002
INVENTOR(S)  : Mark A. Pondelick et al.

It is certified that error appears in the above-identified patent and that said Letters Patent is hereby corrected as shown below:

<u>Column 11,</u>
Line 7, please delete "oyerably" and replace with -- operably --.

Signed and Sealed this

Twenty-first Day of January, 2003

JAMES E. ROGAN
*Director of the United States Patent and Trademark Office*